United States Patent
Schwalb et al.

(10) Patent No.: US 6,925,649 B2
(45) Date of Patent: Aug. 2, 2005

(54) METHODS AND SYSTEMS FOR MASS CUSTOMIZATION OF DIGITAL TELEVISION BROADCASTS IN DASE ENVIRONMENTS

(75) Inventors: Eddie M. Schwalb, Irvine, CA (US); Lee M. Chen, Irvine, CA (US)

(73) Assignee: Sharp Laboratories of America, Inc., Camus, WA (US)

( * ) Notice: Subject to any disclaimer, the term of this patent is extended or adjusted under 35 U.S.C. 154(b) by 1003 days.

(21) Appl. No.: 09/823,863

(22) Filed: Mar. 30, 2001

(65) Prior Publication Data

US 2002/0144261 A1 Oct. 3, 2002

(51) Int. Cl.$^7$ ............................................... H04N 7/025
(52) U.S. Cl. ........................... 725/32; 725/42; 725/131; 725/136; 725/151
(58) Field of Search ............................. 725/32, 34, 35, 725/42, 136, 131, 133, 151

(56) References Cited

U.S. PATENT DOCUMENTS

| | | | |
|---|---|---|---|
| 5,512,935 A | 4/1996 | Majeti et al. ................... 348/9 |
| 6,002,394 A | * 12/1999 | Schein et al. .................. 725/39 |
| 6,100,925 A | 8/2000 | Rosser et al. ................ 348/169 |
| 6,112,226 A | 8/2000 | Weaver et al. ............... 709/203 |
| 6,118,923 A | 9/2000 | Rodriguez .................... 386/83 |
| 6,119,154 A | 9/2000 | Weaver et al. .............. 709/219 |
| 6,122,660 A | 9/2000 | Baransky et al. ........... 709/217 |
| 2001/0003846 A1 | * 6/2001 | Rowe et al. ................... 725/47 |
| 2002/0059577 A1 | * 5/2002 | Lu et al. ........................ 725/9 |
| 2002/0144263 A1 | * 10/2002 | Eldering et al. .............. 725/34 |

\* cited by examiner

Primary Examiner—Krista Bui
(74) Attorney, Agent, or Firm—Kirton & McConkie; Michael F. Krieger

(57) ABSTRACT

Methods and systems for the mass customization of Digital Television broadcasts through the broadcasting of commercials in the form of software applications. Ad-applications are injected into various sub-streams of the transport stream and received in a dormant state by the client-side set-top box. When a commercial is to be shown, a broadcaster broadcasts a generic time-stamped trigger to a dispatching application that performs a keyword matching algorithm to decide which ad-application among those received at the receiver is to be executed. The dispatching application uses the results of the latter comparison to decide which specific dormant ad-application to route to; it then converts the generic trigger into a chosen-ad trigger that is routed to the chosen ad-application. Upon receipt of the chosen-ad trigger, the chosen ad-application executes, thereby displaying an ad customized to the individual viewer's interests.

42 Claims, 3 Drawing Sheets

METHODS AND SYSTEMS FOR MASS CUSTOMIZATION OF DIGITAL TELEVISION BROADCASTS IN DASE ENVIRONMENTS

BACKGROUND

1. Field of the Invention

The present invention relates generally to Digital Television broadcast systems. More particularly, the present invention relates to methods for the mass customization of Digital Television Application Software Environment (DASE) broadcasts.

2. Background Art

The advent of Digital Television (DTV) has added a new dimension to traditional television broadcasting by expanding the types of content that may be broadcasted along with standard program content. For example, digital technology allows software applications, such as applications providing television-based e-commerce capabilities, to be broadcasted through DTV broadcast signals. Digital technology also enables advances in the area of viewer-customized content. For instance, existing art gives a DTV content provider the ability to let viewers select to watch a movie in either a PG-rated version or in an R-rated version. This is done by broadcasting a digital combination of the PG- and R-rated movie versions which are then separated and prepared for viewing at a DTV broadcast receiver such as a set-top box situated at the viewer's location.

While digital technology has greatly expanded the horizons of the television broadcasting industry, existing art has not had the technology to allow the DTV industry to capitalize on the benefits of mass customization. However, the success of Internet as a result of its ability to customize advertising content according to individual consumer profiles or conduct shows the value of individual user-based customization. For example, major Internet-based entities such as Yahoo!® derive a significant portion of their revenue from the mass customization capabilities provided by Internet cookies. In this respect, the multimedia broadcasting industry in general, and terrestrial broadcasting in particular, is lagging behind the Internet industry. Thus, technology that would allow a single broadcast to be mass-customized-i.e., customized so that each individual viewer among the millions of television viewers could watch a broadcast tailored according to that individual viewer's preferences or profile-would be nothing short of invaluable.

The National Institute of Standards and Technology (NIST) and the Advanced Television Systems Committee (ATSC) are developing a broadcast standard, called the Digital Television Application Software Environment (DASE), that sets forth various requirements for DTV systems-e.g., requirements for transmitters and receivers of DTV broadcast signals-designed to run broadcasted software applications. These transmitters and receivers are embodied in the form of a DASE set-top box and conform to DASE standards, including standards for a DASE application programming interface (API). Hence, technology that is readily compatible with DASE technology, in addition to being able to provide mass customization capabilities, would be a particularly valuable advancement in the DTV art.

SUMMARY AND OBJECTS OF THE INVENTION

The present invention may be characterized generally as a software system that enables the mass customization of Digital Television broadcasts through the broadcasting of commercials in the form of software applications. Ad-applications are injected into various sub-streams of the transport stream and received in a dormant state by a client-side broadcast receiver or set-top box. When a service provider, such as a cable TV provider, desires to show an ad, the service provider broadcasts a generic trigger that causes ad-applications at the receiver to execute upon receipt of the trigger. The trigger is time-stamped to indicate the time at which the ad-application is to execute.

A dispatching application located at the client side receives the generic trigger and performs an algorithm to decide which ad-application among those received at the receiver is to be executed. The dispatching application compares content keywords, indicative of the type of ad content associated with the ad-applications, with viewer keywords, indicative of the individual viewer's preferences or profile. The dispatching application uses the results of the latter comparison to decide which specific dormant ad-application to route to; it then converts the generic trigger into a chosen-ad trigger that is routed to the chosen ad-application. Upon receipt of the chosen-ad trigger, the chosen ad-application executes, thereby displaying an ad customized to the individual viewer's interests.

Thus, the present invention provides a method, using ad-applications and triggers, for customizing a single uniform broadcast to fit the preferences of individual viewers. One practical application of the present invention results in the ability to mass customize commercials to best fit the personal interests of each viewer, further resulting in better targeted commercials and simultaneously benefitting the viewer and advertiser. In addition, this mass customization enables an arbitrary increase in broadcast advertisement time capacity, thereby further increasing the availability of a critical revenue source for broadcasters. All this is achieved without requiring extensive upgrades to existing DTV infrastructures and, at least in the preferred embodiments of the present invention, without sending individual viewer information back to the server.

Accordingly, it is an object of some embodiments of the present invention to provide a Digital Television broadcasting system that enables, through broadcasting advertising content in the form of dormant applications, the mass customization of a single broadcast without requiring communication back to the server.

Another object of some embodiments of the present invention is to provide a Digital Television broadcasting system including broadcasted elements such as ad-applications, event triggers, and a dedicated dispatching application that sends the event triggers to the appropriate ad-application, selected by a keyword matching algorithm, for activation of that ad-application.

A further object of some embodiments of the present invention is to provide a Digital Television broadcasting system that provides for the mass customization of a single broadcast without the need for synchronized broadcast sub-streams.

Yet another object of some embodiments of the present invention is to provide a Digital Television broadcasting system that provides customized advertisement sequences through the use of ad-applications and event triggers.

Another object of some embodiments of the present invention is to provide a DASE Digital Television broadcasting system that fits easily into existing DTV infrastructures and that can efficiently mass customize commercials according to individual viewer interests.

Another object of some embodiments of the present invention is to provide a DASE Digital Television broadcasting system that uses ad-applications, triggers, and a keyword matching algorithm to provide a customized advertisement stream for each individual viewer.

A further object of some embodiments of the present invention is to provide a Digital Television broadcasting system having a dispatching application that routes an ad-application trigger to an ad-application selected according to each individual viewer's interests.

Yet another object of some embodiments of the present invention is to provide a Digital Television broadcasting system that can create a customized advertisement stream, through the use of triggers, without sending individual viewer information back to the server.

A further object of some embodiments of the present invention is to provide a Digital Television broadcasting system that improves the viewer's experience by omitting ads not related to the viewer's interests.

Another object of some embodiments of the present invention is to provide a Digital Television broadcasting system that increases overall advertisement time and capacity.

These and other objects and features of the present invention will become more fully apparent from the following description, drawings, and the appended claims. Other objects will likewise become apparent from the practice of the invention as set forth hereafter.

BRIEF DESCRIPTION OF THE DRAWINGS

The foregoing and other objects and features of the present invention will become more fully apparent from the accompanying drawings when considered in conjunction with the following description and appended claims. Although the drawings depict only typical embodiments of the invention and are thus not to be deemed limiting of the invention's scope, the accompanying drawings help explain the invention in added detail.

DETAILED DESCRIPTION OF EMBODIMENTS OF THE PRESENT INVENTION

Figure 1:
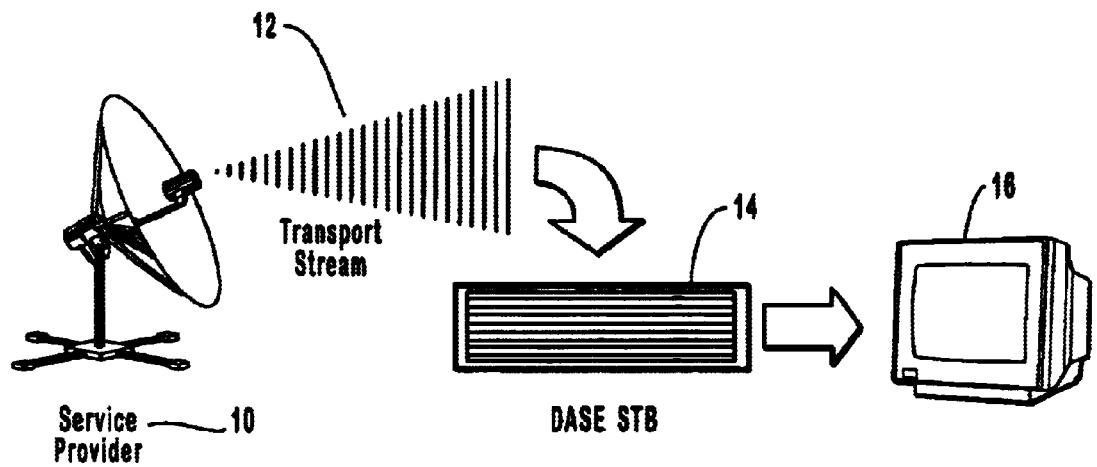
FIG. 1 illustrates the general environment of some embodiments of the present invention.

The following detailed description, in conjunction with the accompanying drawings (hereby expressly incorporated as part of this detailed description), sets forth specific numbers, materials, and configurations in order to provide a thorough understanding of the present invention. In other instances, well-known features are omitted or simplified so as not to obscure the invention. However, the following detailed description in conjunction the drawings will enable one skilled in the art to make and use the present invention even absent the omitted details.

The purpose of this detailed description being to describe the invention so as to enable one skilled in the art to make and use the present invention, the following description sets forth various specific examples, also referred to as "embodiments," of the present invention. While the invention is described in conjunction with specific embodiments, it will be understood, because the embodiments are for explanatory purposes only, that this description is not intended to limit the invention to these particular embodiments. Indeed, it is emphasized that the present invention can be embodied or performed in a variety of ways; the detailed description and the drawings do not limit the scope of the invention because the substantive scope of the present invention is to be limited only by the appended claims. The drawings and detailed description are merely representative of particular embodiments of the present invention.

It should be noted that because some embodiments of the present invention are computer-implemented, the present invention includes embodiments that range from computer-executable instructions as part of computer readable media to hardware used in any or all of the depicted structures. Implementation may additionally be combinations of hardware and computer-executable instructions. For brevity, computer readable media having computer-executable instructions may also be referred to as "software" or "computer software."

Reference will now be made in detail to several embodiments of the invention. The various embodiments will be described in conjunction with the accompanying drawings wherein like elements are designated by like alphanumeric characters throughout.

The present invention may be characterized generally as a software-based system for use with a Digital Television (DTV) broadcast receiver. Commercials are broadcast in the form of software applications that are injected into various sub-streams of the transport stream and received in a dormant state by the client-side set-top box. When a broadcaster wants to show commercials, the broadcaster broadcasts a generic time-stamped trigger to a client-side dispatching application that performs an algorithm to decide which ad-application among those received at the receiver is to be executed. The dispatching application then converts the generic trigger into a chosen-ad trigger and routes the latter to the chosen ad-application. Upon receipt of the chosen-ad trigger, the chosen ad-application executes, thereby displaying an ad customized to the individual viewer's interests.

With reference now to the accompanying drawings, FIG. 1 shows the general environment of the present invention. A service/content provider 10, e.g., a television station program provider, cable TV provider, or Internet web site, transmits a broadcast or transport stream 12. The transport stream 12 is received by a client-side broadcast rendering device or receiver 14 (here shown as a DASE set-top box) that is adapted to detect the transport stream 12 and prepare the content therein for display on a client-side display 16. The display can be any sort of suitable television display, including a wide screen TV, a flat screen TV, an HDTV, or a computer monitor.

Figure 2:
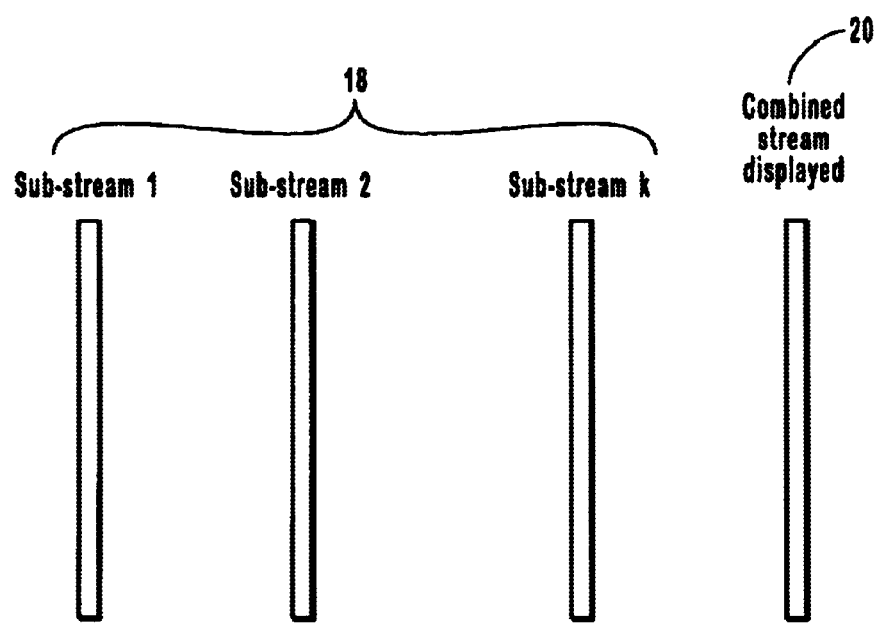
FIG. 2 is a schematic diagram of the sub-streams and combined displayed stream according to some embodiments of the present invention.

The transport stream 12 comprises multiple alternative sub-streams or sub-channels 18 (shown schematically in FIG. 2) that are merged/multiplexed together into the transport stream 12 so that the display 16 can selectively display any one of the alternative sub-streams 18 at a time, resulting effectively in the display of a combined stream 20 that comprises a sequence of alternating sub-streams 18. Alternatively, two or more combined streams 20 may be displayed on the display 16—such as in a picture-in-picture display.

The alternative sub-streams 18 contain various types of audio, video, and data content including, but not limited to, television and cable programs, commercial advertisements, web content, stock reports, telephone directories, and electronic coupons that an attached computer can print out. In the preferred embodiments, the transport stream 12 is broadcast in a format that does not need an upstream channel for the receiver 14 to indicate which alternative media sub-stream 18 segment to view. Also, in the preferred embodiments of the present invention, the transport stream 12 is a Digital TV Application Software Environment (DASE) broadcast stream that is able to transport software components called DASE applications (e.g., e-commerce applications) that are designed to be run on the client-side broadcast rendering machine 14.

One important aspect of the present invention is the use of triggers/events that "wake up" or activate "dormant" software applications broadcasted via the transport stream 12. These triggers are event data structures as described, for example, by the standards of the ATSC Data Broadcast Standard (A90) and ATSC DASE. The triggers are injected into the transport stream 12 preferably at the time that the sub-streams 18 are merged/multiplexed. Triggers could be transmitted as meta-data attached to the sub-stream 18 video frames (or fields). The means for transmitting these event triggers may be any standard means; however, the preferred means is one that conforms to ATSC standards. Moreover, the means for exposing the triggers to the target application can be any standard device or means. Again, the preferred mechanism, however, would be one that conforms to ATSC standards.

Another important aspect of the present invention involves the broadcasting of ad-applications to be "woken up"/activated by the triggers. In other words, instead of being sent in the form of passive video clips, ads or commercials are sent in the form of dormant software applications-whether declarative (e.g., HTML) or procedural (e.g., Java) applications. The ad-applications are injected into the transport stream 12 and loaded at the client end by the set-top box or broadcast receiver 16. At the client end, the dormant ad-application then awaits the receipt of a broadcasted trigger to instruct the ad-application as to when to execute. Upon execution, the ad-application displays an ad, or series of ads, on the display 16.

In the preferred embodiments of the present invention, the broadcaster/service provider 10 transmits a generic trigger via the transport stream 12 when the broadcaster desires to display a commercial or series of commercials. This generic trigger is designed to activate the ad-applications. However, in the preferred embodiments, the receiver 14, instead of routing the generic trigger directly to an ad-application, routes the generic trigger to a dispatching application. The dispatching application first chooses which of the ad-applications in the various sub-streams 18 are to be executed; it then converts the generic trigger into a chosen-ad trigger and routes the chosen-ad trigger to the chosen ad-application. Upon receipt of the chosen-ad trigger, the chosen ad-application executes and displays its ad or series of ads on the display 16.

Various methods can be used to determine which ad-application is chosen for execution. In the preferred embodiments, keyword metrics is used to customize the displayed stream 20. For example, content keywords are tagged to the ad-applications to represent the content of the ads. These content keywords are tagged to the ad-applications by means known in the art and may provide various information about the associated ads. The content keywords can be injected into HTML files or Java class files using commercial off-the-shelf means.

As an example of how content keywords operate, the content keywords can identify ad content such as "sports ads," "ads directed to women," "food ads," etc. In the preferred embodiments of the present invention, certain sub-streams 18 are designated to carry advertising content relating to one specific ad category. For example, one sub-stream 18 may be designated to carry the sports ads, another sub-stream 18 the food ads, and so forth. In another alternative, one or more sub-streams 18 may be designated to carry ad-applications of all categories.

Along with content keywords, the preferred embodiments of the present invention also provide for viewer keywords. The viewer keywords indicate the individual viewer's preferences or profile and are preferably located on a client-side device that is operatively coupled to the broadcast receiver 14. For example, in the preferred embodiments, the viewer enters keywords (e.g., through selecting from a list of selections displayed on the display 16) that represent his or her preferences or interests. The viewer who is interested in sports might choose to limit the commercials shown on display 16 to sports ads and accordingly select "sports ads" from a list presented on the display 16. The viewer might make such a selection using a user input device such as a remote control.

Alternatively or additionally, the viewer keywords may represent a viewer profile that is automatically generated as a consequence of user input-similar to the manner in which Internet cookies can gather user information. For example, when the viewer selects a certain type of program to watch (for example, a sports program), the broadcast receiver 14, or other device operatively coupled to the broadcast receiver 14, may store one or more viewer keywords (e.g., "sports") corresponding to or relating to the viewer's selection.

When the dispatching application receives a generic trigger, the dispatching application accesses both the content keywords of each dormant ad-application currently present at the receiver 14 as well as the viewer keywords. Subsequently, the two types of keywords are compared by calculating a match score, here designated as "d." In one embodiment, match score d is a quantitative value representative of the degree of match between the content keywords and the viewer keywords. For example, the values of d might be assigned to range between 0 and 1, where 1 indicates a perfect match and 0 indicates no match. It is contemplated that the match score d is to be calculated by means known in the art such as by web search engine technology that allows users to pull up a list of various web sites upon the entering of one or more keywords.

Once the match scores for all the ad-applications in each sub-stream 18 are compared, the dispatching application, in some embodiments, selects the ad-application producing the best match score d and converts the generic trigger into a chosen-ad trigger that is routed to the selected ad-application. Subsequently, the selected ad-application executes at the appropriate time designated by the trigger, and the display 16 is switched to show the ad or series of ads contained within the ad-application. As a result, to return again to the example of the case wherein the viewer keywords relate to sports, the dispatching application routes all the generic triggers to sports-related ad-applications, consequently resulting in a customized ad sequence of sports ads shown on display 16.

The use of the dispatching application to route the generic trigger differently for each receiver 14 thus enables the mass customization of a television broadcast in that it can customize a single broadcast for each individual viewer so that each viewer views a broadcast sequence tailored according to that individual's preferences. For example, one particular viewer's display might be customized to show health-related ads; another might show parenting-related ads; yet another might display sports-related ads. As a result, any one of the commercials positioned within the various sub-streams 18 is potentially viewable by viewers, thereby significantly increasing the total number of viewable commercials. In fact, theoretically, the total number of distinct customized displayed streams 20 that can be assembled from k substreams 18-each sub-stream 18 having n number of ad-applications-is $k^n$. Therefore, the total number of custom broadcasts grows exponentially with the number of ad-applications and the number of individual sub-streams, effectively increasing advertisement time capacity significantly.

It is important to note that, with respect to the keyword matching algorithm, instead of switching to the ad-application with the "best" match value, switching may be determined by other means. For example, in some embodiments of the present invention, an ad-application might be chosen based on whether the match score meets a designated threshold value. For example, the dispatching application might choose for display the first ad-application to produce a match score meeting a designated threshold value.

Also, in the preferred embodiments of the present invention, the viewer keywords are not sent back to the service provider 10. Thus, the preferred embodiments are able to customize broadcasts without requiring a viewer login procedure and without communicating personal viewer information to the server, thereby protecting the privacy of viewers by not disclosing to the broadcaster the viewer preferences or the specific broadcast combination displayed on display 16. In other embodiments of the present invention, a return channel (not shown) containing viewer preference information or keywords is used to enable the broadcaster and the advertisers to obtain statistic market reach information. However, these embodiments having a return channel are not the preferred embodiments because they eliminate the above-mentioned advantage of protecting viewer privacy.

It should also be noted that the dispatching application may be broadcast to the set-top box or receiver 14 by the content provider 10 in the same way that all other DASE software applications are broadcast. Alternatively, the dispatching application can come pre-loaded on the set-top box/receiver 14.

The timing of the present invention is controlled by the triggers because they contain information indicative of the time at which the ad-application is to execute. It will be noted that the service provider 10 must transmit the generic trigger early enough so as to allow sufficient time for its broadcast transmission, the performance of the above-discussed matching algorithm, and the conversion of the generic trigger into a chosen-ad trigger. Also, in the preferred embodiments, the triggers are time-stamped to indicate the time at which the matching algorithm must start and at which the ad-applications are to be executed. Such time stamps are well known in the art and typically comprise a fixed number of bits (e.g., 32 bits) within the sub-streams 18.

Figure 3:
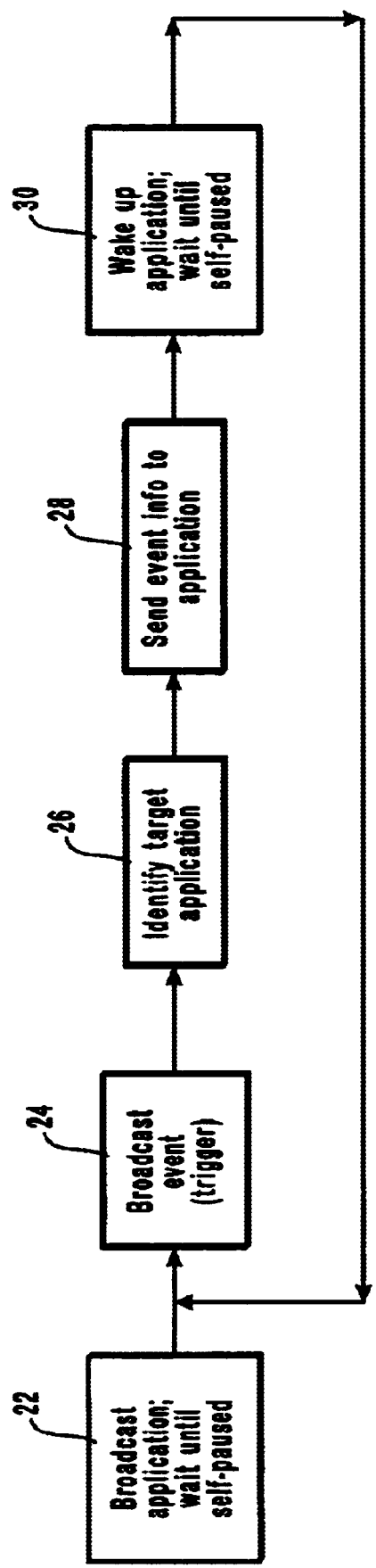
FIG. 3 illustrates the general manner in which DTV broadcasters use triggers to wake up a dormant software application.

Turning now to FIG. 3, one can see the general manner in which DTV broadcasters use triggers to wake up a dormant software application. First, as shown at 22, the broadcaster 10 broadcasts a software application via the transport stream 12 and waits until that application is paused at the receiver 14. Next, as shown at 24, the broadcaster 10 broadcasts an event or trigger via the transport stream 12. Upon receipt of the trigger, the receiver 14 identifies the target application 26 and sends the event information to the latter application 28. When the application receives the trigger, it "awakes"-i.e., it executes-and pauses 30 for the cycle to potentially repeat again when another trigger is received.

Figure 4:
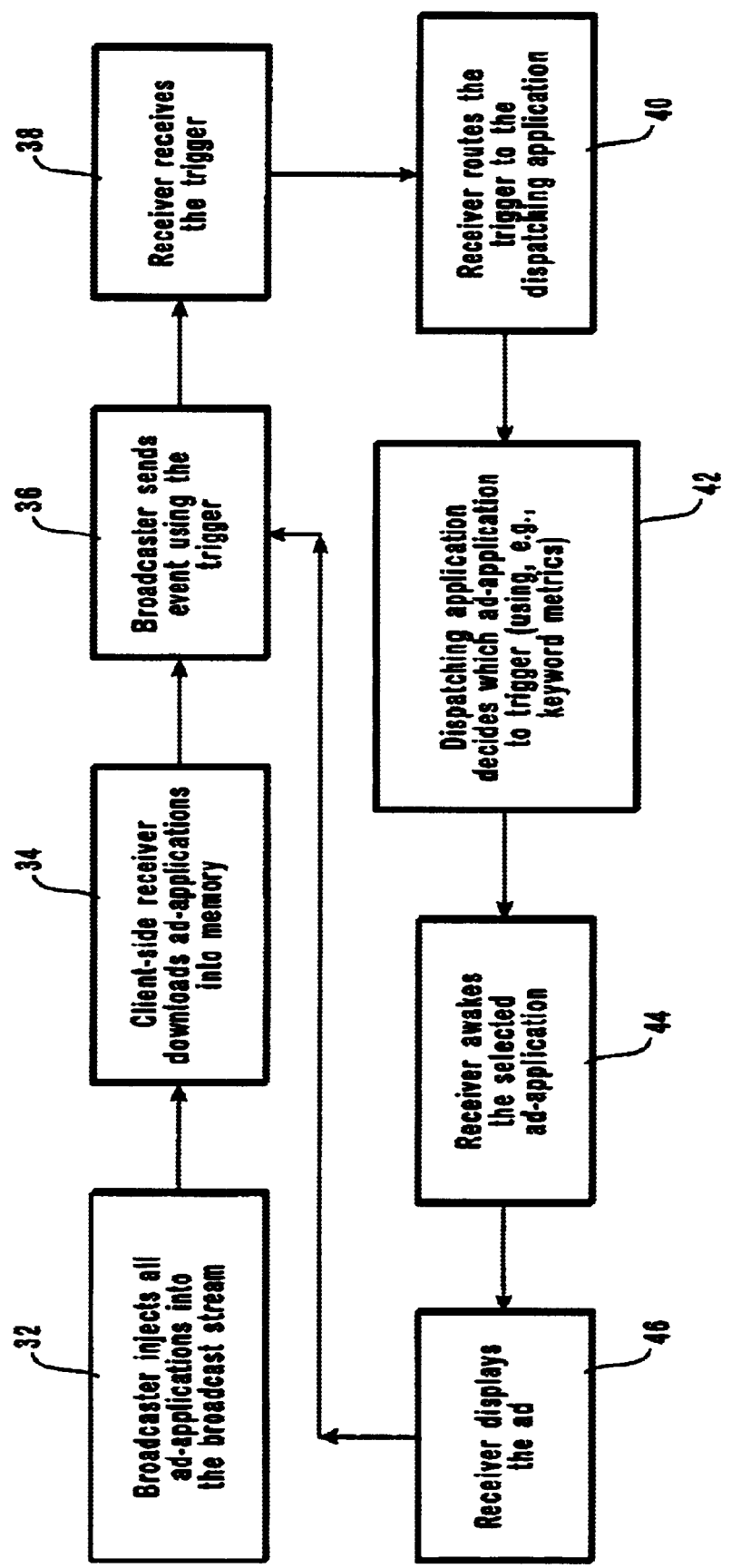
FIG. 4 shows, in accordance with the preferred embodiments of the present invention, how a generic trigger is routed to the dispatching application for selection of which ad-application to wake up.

FIG. 4 shows how the preferred embodiments of the present invention involve the use of a dispatching application to route the trigger to a specific ad-application. Here, the broadcaster 10 injects ad-applications into the broadcast stream 32; the client-side receiver 14 downloads the ad-applications into memory 34; the broadcaster 10 sends an event using a generic trigger 36; the receiver 14 receives the trigger 38; and the receiver 14 routes the generic trigger to a dispatching application 40. The dispatching application then determines which cached ad-application to route the trigger to (effectively converting the generic trigger into a chosen-ad trigger) by using, in the preferred embodiments, keyword metrics 42. The receiver 14 then awakes the selected ad-application 44 and displays the ad associated with the ad-application 46. The displayed ad is displayed on the display 16 and may include a graphical user interface (GUI). As with the process outlined in FIG. 3, this process may be repeated when another trigger is sent.

It should be emphasized that the present invention may be embodied in various specific forms without departing from the scope of the present invention. For example, High Definition Television (HDTV) broadcasts come within the scope of the present invention as well as standard DTV broadcasts. Also, the present invention may be operable in both wired and wireless environments.

Further, in some embodiments of the present invention, the methods of the present invention can be incorporated into a hierarchical video stream merging apparatus, whereby the merged stream contains multiple sub-streams, each customized to contain local content such as local advertisements. In some embodiments, the methods of the present invention may be employed by means of a card for a personal computer that turns the computer into a set-top box of sorts. Such a card accepts and decodes ATSC signals for feeding to a DTV.

In brief, the present invention provides a method and system for the mass customization of Digital Television broadcasts through the broadcast of commercials in the form of dormant software applications. Practical application of the present invention enables the automatic selection of commercials that best fit the personal interests of each viewer, resulting in better targeted commercials while simultaneously benefitting the viewer and advertiser. The present invention can improve the viewer's experience by omitting ads not related to the viewer's interests as well as by automatically adjusting a broadcast schedule to better fit a viewer's schedule. In addition, this mass customization enables an arbitrary increase in broadcast advertisement time capacity, thereby further increasing the availability of a critical revenue source for broadcasters. Moreover, in the preferred embodiments of the present invention, all this is achieved without sending individual viewer information back to the server.

It is again emphasized that the present invention may be embodied in other specific forms without departing from its spirit or essential characteristics. The described embodiments herein should be deemed only as illustrative. Indeed, the appended claims indicate the scope of the invention; the description, being used for illustrative purposes, does not limit the scope of the invention. All variations, alternatives, modifications, and equivalents that come within the meaning and range of equivalency of the claims are to be embraced within the scope of the claims.

What is claimed is:

1. A method for the mass customization of digital television broadcasts comprising:

transmitting a digital television broadcast comprising a plurality of sub-streams;

transmitting, via said sub-streams, a plurality of television commercials in the form of dormant software applications, wherein said dormant applications are tagged with content keywords indicative of the content of said commercials; and transmitting, via said sub-streams, a generic time-stamped trigger to a dispatching application that selects, based on said content keywords, which dormant application to trigger, said dispatching application thereafter converting the generic trigger into a chosen-ad trigger targeted at the selected dormant application, said selected dormant application thereafter executing for display on a client-side display at the time indicated by said generic time stamp.

2. The method of claim 1 wherein said dispatching application selects which dormant application to trigger by comparing, at the client end, said content keywords with viewer keywords.

3. The method of claim 2 wherein said viewer keywords comprise viewer-entered preferences.

4. The method of claim 3 wherein said viewer keywords are transmitted through a return channel back to the broadcaster.

5. The method of claim 2 wherein said viewer keywords comprise a viewer profile.

6. The method of claim 2 wherein said comparing is based on determining a best match score.

7. The method of claim 6 wherein said sub-streams are transmitted in a format that does not need an upstream channel to indicate which of said sub-streams to display.

8. The method of claim 2 wherein said comparing is based on determining a match score and whether said match score meets a threshold value.

9. The method of claim 1 wherein certain of said sub-streams are designated to carry advertising content of one category.

10. The method of claim 1 wherein said sub-streams each carry any category of advertising content.

11. The method of claim 1 wherein said display is an HDTV.

12. The method of claim 1 wherein said display is a picture-in-picture display.

13. The method of claim 1 wherein said digital television broadcast is broadcast by an Internet provider.

14. The method of claim 1 wherein said sub-streams conform to DASE standards.

15. A method comprising:

transmitting a DASE digital television broadcast comprising a plurality of sub-streams;

transmitting, via said sub-streams, a plurality of television commercials in the form of ad-applications, wherein said ad-applications are tagged with content keywords indicative of the content of said commercials;

transmitting, via said sub-streams, a dispatching application that performs a matching algorithm comprising:

comparing said content keywords with viewer-entered keywords;

deriving a match score from said comparing of said keywords;

selecting, based on the best value of said match score, an ad-application;

transmitting, via said sub-streams, a generic time-stamped trigger to said dispatching application, said dispatching application performing said matching algorithm upon receipt of said trigger, said dispatching application thereafter converting the generic trigger into a chosen-ad trigger targeted at the selected ad-application, said selected ad-application thereafter executing for display on a client-side display at the time indicated by said generic time stamp.

16. A method comprising:

receiving a plurality of DASE sub-streams;

receiving, via said sub-streams, a plurality of television commercials in the form of ad-applications, wherein said ad-applications are tagged with content keywords indicative of the content of said commercials;

loading a dispatching application, said dispatching application being capable of performing a matching algorithm comprising:

comparing said content keywords with viewer keywords;

deriving a match score from said comparing of keywords;

selecting, based on the best value of said match score, an ad-application;

receiving, via said sub-streams, a generic time-stamped trigger;

routing said generic time-stamped trigger to said dispatching application, said dispatching application performing said matching algorithm upon receipt of said trigger, said dispatching application thereafter converting the generic trigger into a chosen-ad trigger targeted at the selected ad-application, said selected ad-application thereafter executing for display on a client-side display at the time indicated by said generic time stamp.

17. The method of claim 16 wherein said viewer keywords comprise viewer-entered preferences.

18. The method of claim 16 wherein said viewer keywords comprise a viewer profile.

19. The method of claim 16 wherein each of said sub-streams carries advertising content and is designated to carry one category of advertising content.

20. The method of claim 16 wherein said dispatching application is received via said sub-streams.

21. The method of claim 16 wherein said dispatching application comes pre-loaded on a set-top box.

22. A method comprising:

entering keywords into a broadcast rendering device coupled to a display; and viewing a customized digital television commercial broadcast on said display wherein said customized commercial broadcast comprises a combined stream of executing ad-applications, said ad-applications executing upon the receipt of a plurality of triggers broadcasted by a content provider, said triggers being routed to said ad-applications by a dispatching application that performs an algorithm to determine which ad-applications to route said triggers to.

23. The method of claim 22 wherein said customized broadcast is compatible with DASE standards.

24. The method of claim 22 wherein said algorithm is a keyword matching algorithm.

25. A system comprising:
a plurality of digital television broadcast sub-streams;
a plurality of commercials designed to be broadcasted, via said sub-streams, in the form of dormant software applications;
a plurality of content keywords indicative of the commercial content of said dormant software applications;
a plurality of viewer keywords representing an individual viewer's interests;
a plurality of triggers designed to activate said dormant applications;
a broadcast rendering device for receiving said broadcast sub-streams and said viewer keywords;
a dispatching application for receiving said triggers and for thereafter performing a comparison between said content keywords and said viewer keywords and, based upon a match score that said dispatching application determines from said comparison, selecting one of said dormant software applications for execution and presentation within a combined stream; and
a display coupled to said broadcast rendering device for displaying said combined stream.

26. The system of claim 25 wherein said dispatching application is located within the broadcast rendering device.

27. The system of claim 25 wherein said viewer keywords comprise viewer-entered preferences.

28. The system of claim 25 wherein said viewer keywords comprise a viewer profile.

29. The system of claim 25 wherein said viewer keywords are transmitted through a return channel back to the broadcaster.

30. The system of claim 25 wherein said selecting is based on determining a best match score.

31. The system of claim 25 wherein said selecting is based on determining a match score and whether said match score meets a threshold value.

32. The system of claim 25 wherein said sub-streams are transmitted in a format that does not need an upstream channel to indicate which of said sub-streams to display.

33. The system of claim 25 wherein certain of said sub-streams are designated to carry advertising content of one category.

34. The system of claim 25 wherein said sub-streams each carry any category of advertising content.

35. The system of claim 25 wherein said display is an HDTV.

36. The system of claim 25 wherein said display is a picture-in-picture display.

37. The system of claim 25 wherein said digital television broadcast sub-streams are broadcast by an Internet provider.

38. The system of claim 25 wherein said sub-streams conform to DASE standards.

39. The system of claim 25 wherein said broadcast rendering device is a set-top box.

40. The system of claim 25 further comprising a hierarchical video stream merging apparatus whereby said combined stream comprises multiple sub-streams each customized to contain local advertising content.

41. The system of claim 25 wherein the total number of possible variations of said combined stream grows exponentially with the number of dormant software applications and the number of individual sub-streams.

42. A system enabling the mass customization of a DTV broadcast without sending viewer information back to the server, said system comprising:
a plurality of DASE digital television broadcast sub-streams;
a plurality of commercials designed to be broadcasted, via said sub-streams, in the form of dormant software applications;
a plurality of content keywords indicative of the commercial content of said dormant software applications, said keywords being tagged to said dormant software applications;
a plurality of viewer keywords representing an individual viewer's interests;
a plurality of generic triggers and chosen-ad triggers designed to activate said dormant applications;
a DASE set-top box for receiving said broadcast sub-streams and said viewer keywords;
a dispatching application, loaded on said DASE set-top box, for receiving said generic triggers and thereafter performing a comparison between said content keywords and said viewer keywords, said comparison being based upon a match score that said dispatching application determines from said comparison, said dispatching application thereafter selecting one of said dormant software applications, based on said comparison, to route one of said generic triggers in the form of a chosen-ad trigger, and said dormant software application, upon receipt of said chosen-ad trigger, executing for display within a combined stream; and
a display coupled to said DASE set-top box for displaying said combined stream.

* * * * *